United States Patent [19]
Abefelt et al.

[11] Patent Number: 5,347,513
[45] Date of Patent: Sep. 13, 1994

[54] FAST OPERATING PROGRAM CONTROLLED DIGITAL UNISWITCH

[75] Inventors: Erik O. Abefelt, Vällingby; Lars-Göran Petersen, Tumba; Sture G. Roos, Bergshamra, all of Sweden

[73] Assignee: Telefonaktiebolaget L M Ericsson, Stockholm, Sweden

[21] Appl. No.: 990,464

[22] Filed: Dec. 15, 1992

[30] Foreign Application Priority Data

Dec. 16, 1991 [SE] Sweden ................... 9103719

[51] Int. Cl.⁵ .......................... H04L 12/56
[52] U.S. Cl. ................... 370/58.3; 370/60.1
[58] Field of Search ............ 370/58.1, 60, 60.1, 370/68.1, 54, 58.3

[56] References Cited

U.S. PATENT DOCUMENTS

| | | | |
|---|---|---|---|
| 4,520,477 | 5/1985 | Wen | 370/58 |
| 4,953,158 | 8/1990 | Schreur | 370/60.1 |
| 4,959,830 | 9/1990 | Petersen | 370/108 |
| 4,999,832 | 3/1991 | Chen et al. | 370/85.14 |
| 5,014,266 | 5/1991 | Bales et al. | 370/60.1 |

FOREIGN PATENT DOCUMENTS 0418475 5/1990 European Pat. Off. .
WO80/00775 4/1980 PCT Int'l Appl. .
WO92/05648 4/1992 PCT Int'l Appl. .
461310 1/1990 Sweden .

OTHER PUBLICATIONS

"Telecommunication Telephone Network 2", Ericsson, eleverket and Studentlitteratur, 1987, Chapter 9: Digital Switching Systems.

*Primary Examiner*—Benedict V. Safourek
*Attorney, Agent, or Firm*—Burns, Doane, Swecker & Mathis

[57] ABSTRACT

A fast operating, combined packet and circuit switch. The switch includes a number of units which are distributed locally and which are mutually connected by means of physical links. In a packet-switched network, which is comprised of packet handlers and the links, each connected unit affects at least one control-time-slot. In this way, each unit is able to operate the circuit switch so as, for instance, to establish and release circuit-switched connections, in response to control commands transmitted on the packet-switched network. As a result of the packet switch, the whole of the switch can be configured at a cold start and during operation, therewith satisfying the individual bandwidth requirement of each connected unit.

20 Claims, 12 Drawing Sheets

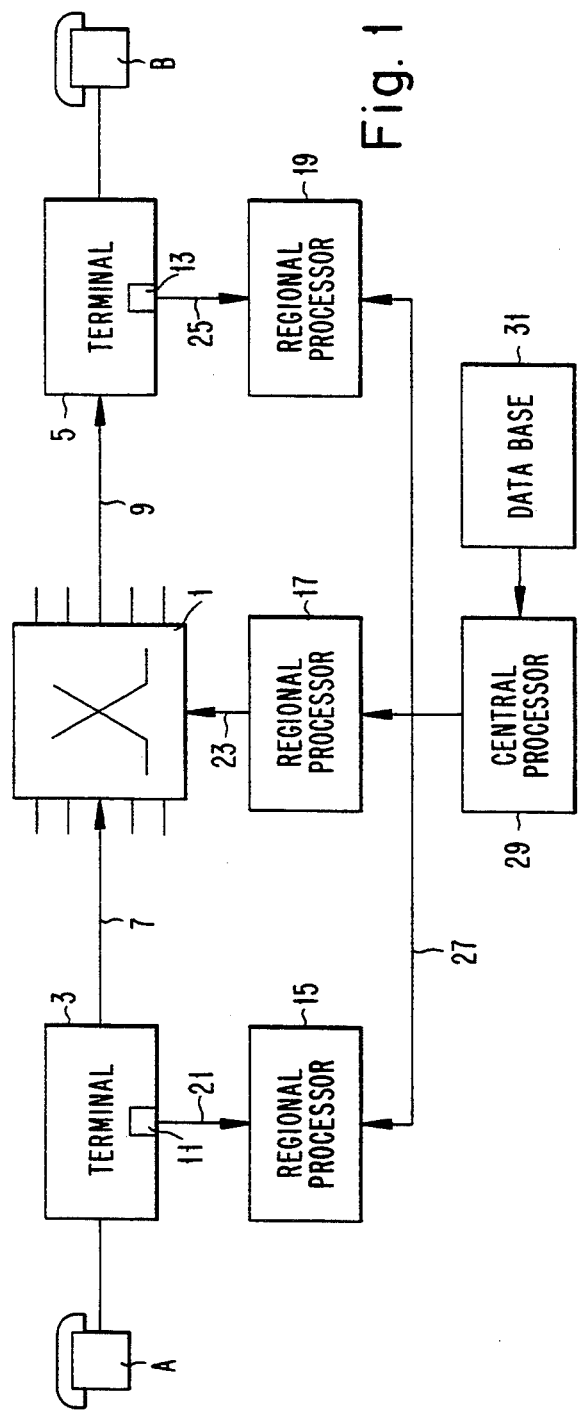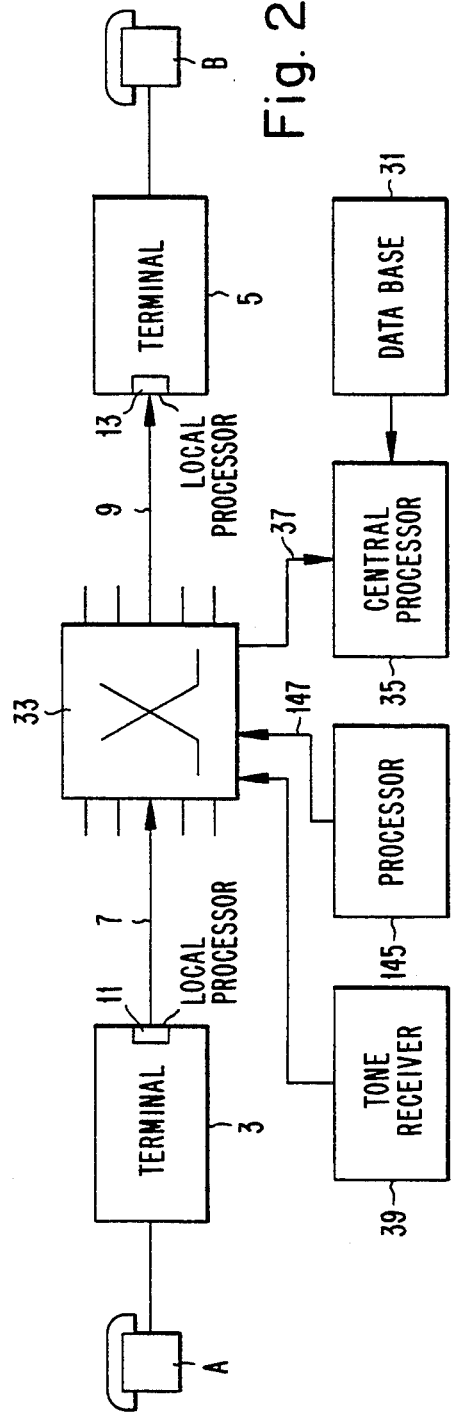

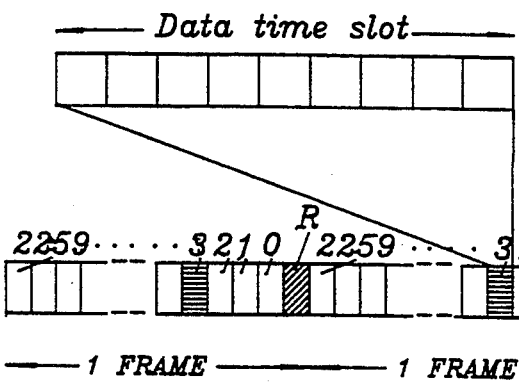
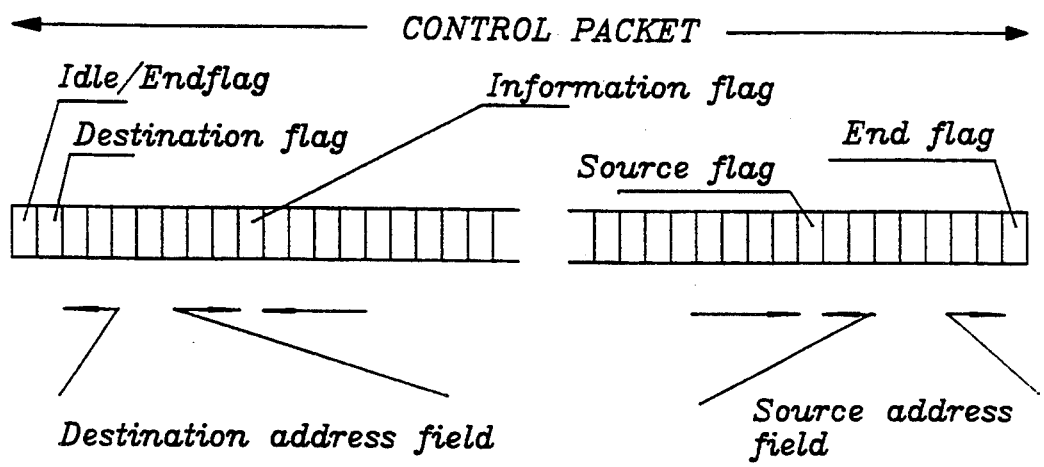

Packet delimiting flags
FIG 4A
| 5 | 4 | 3 | 2 | 1 | 0 | |
|---|---|---|---|---|---|---|
| 0 | 0 | 0 | 0 | 0 | 1 | DEST |
| 0 | 0 | 0 | 0 | 1 | 0 | INFO |
| 0 | 0 | 0 | 0 | 1 | 1 | SOURCE |
| 0 | 0 | 0 | 1 | 0 | 0 | END |
| 0 | 0 | 0 | 1 | 0 | 1 | BROADCAST |
FIG 4B
| 0 | 0 | 0 | 1 | 1 | 1 | IDLE |
|---|---|---|---|---|---|---|
Flow control flags
FIG 4C
| 0 | 0 | 1 | 0 | 0 | 0 | ACC |
|---|---|---|---|---|---|---|
| 0 | 0 | 1 | 0 | 0 | 1 | HLD |
| 0 | 0 | 1 | 0 | 1 | 0 | RTS |
| 0 | 0 | 1 | 0 | 1 | 1 | NAC |
FIG 4D
1 CTS
FIG 4E
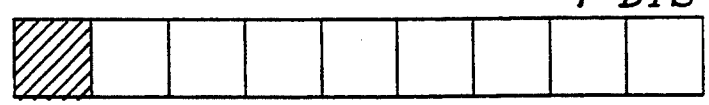
1 DTS
FIG 4F
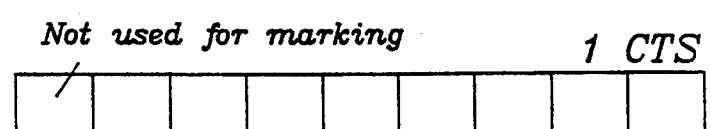
Not used for marking — 1 CTS
FIG 4G
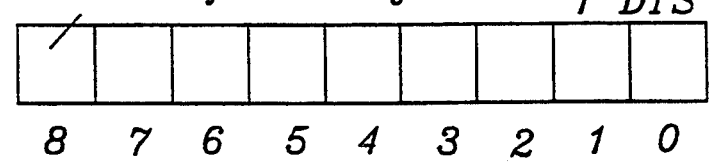
Not used for marking — 1 DTS
8 7 6 5 4 3 2 1 0

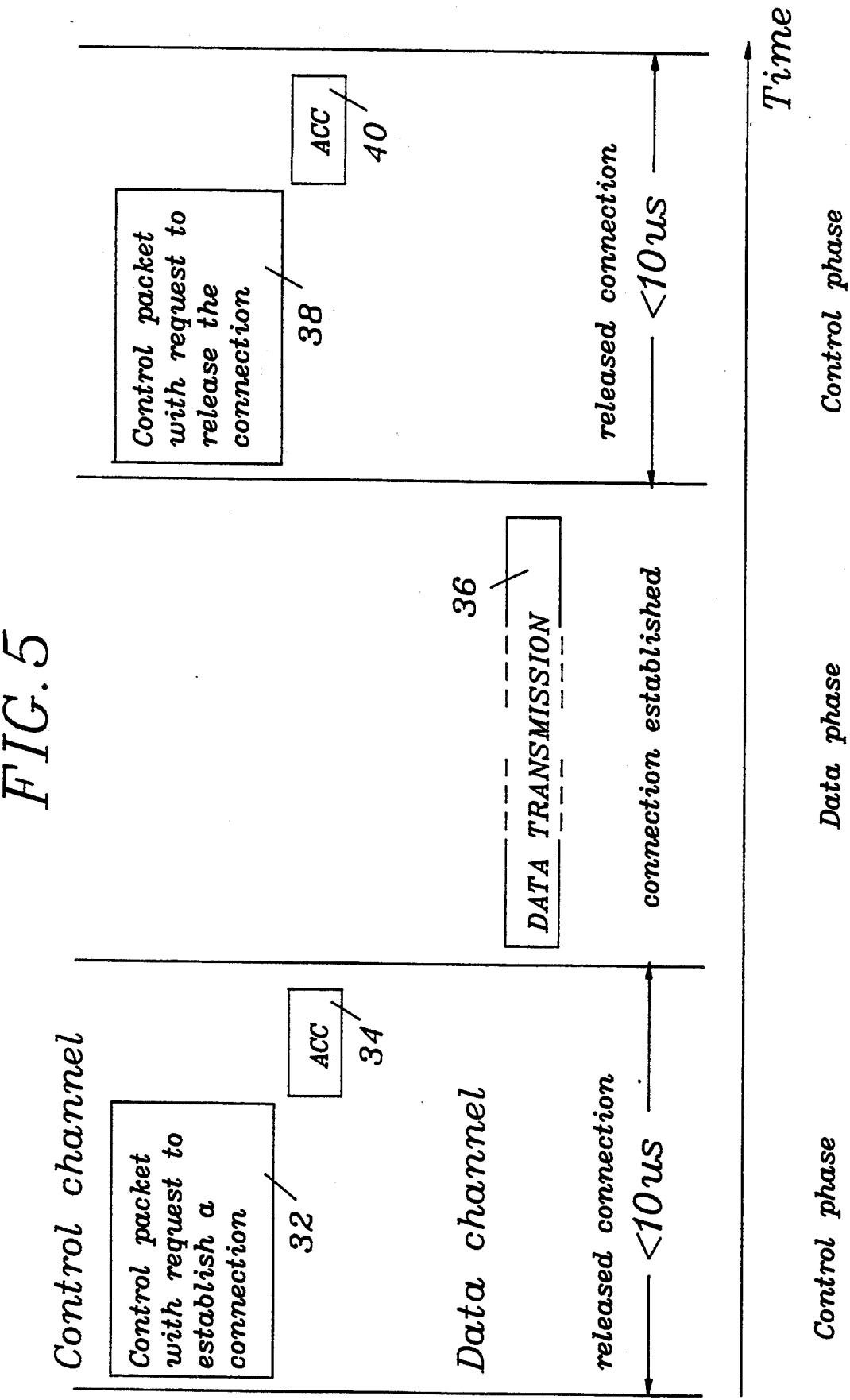

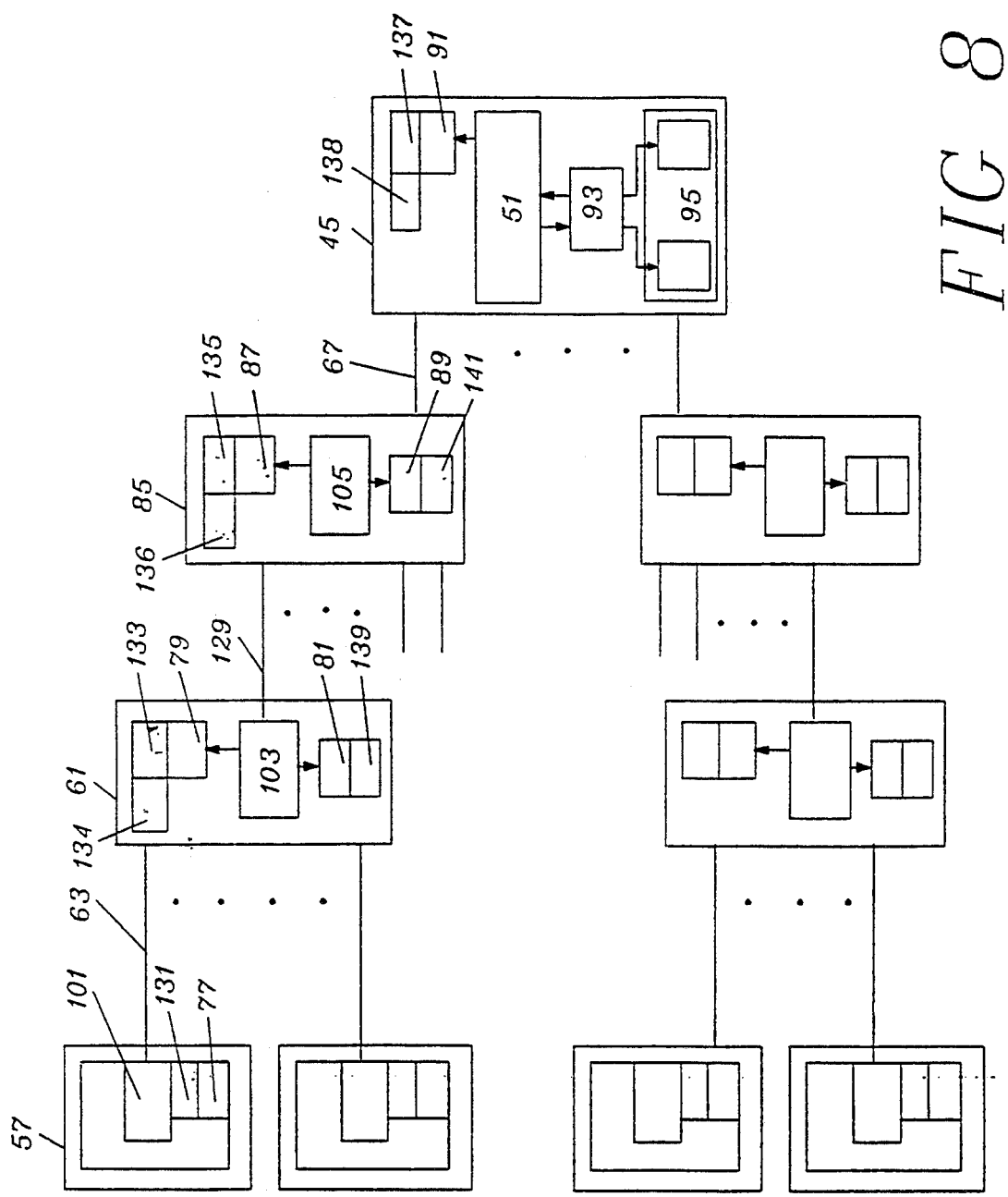

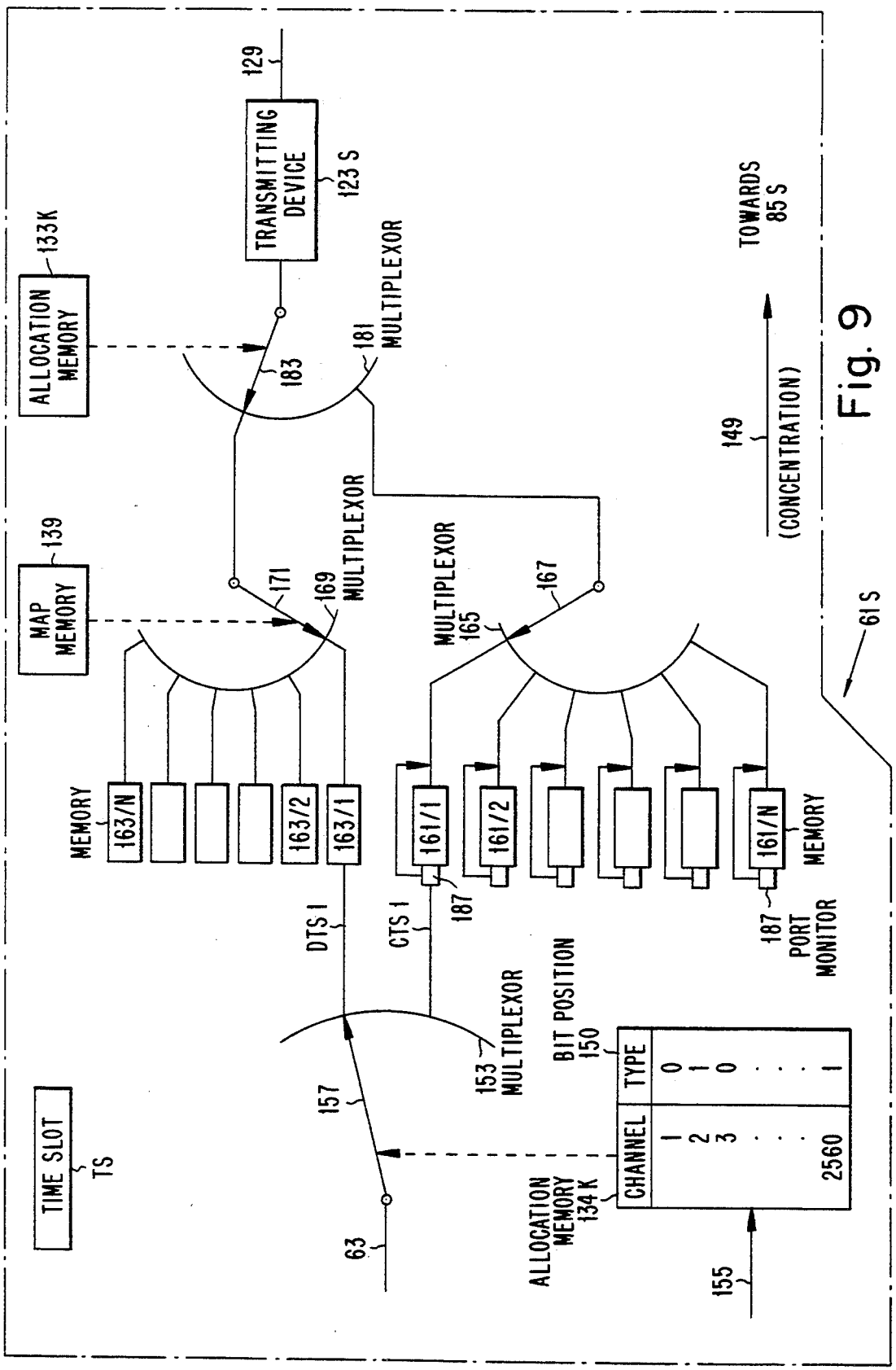

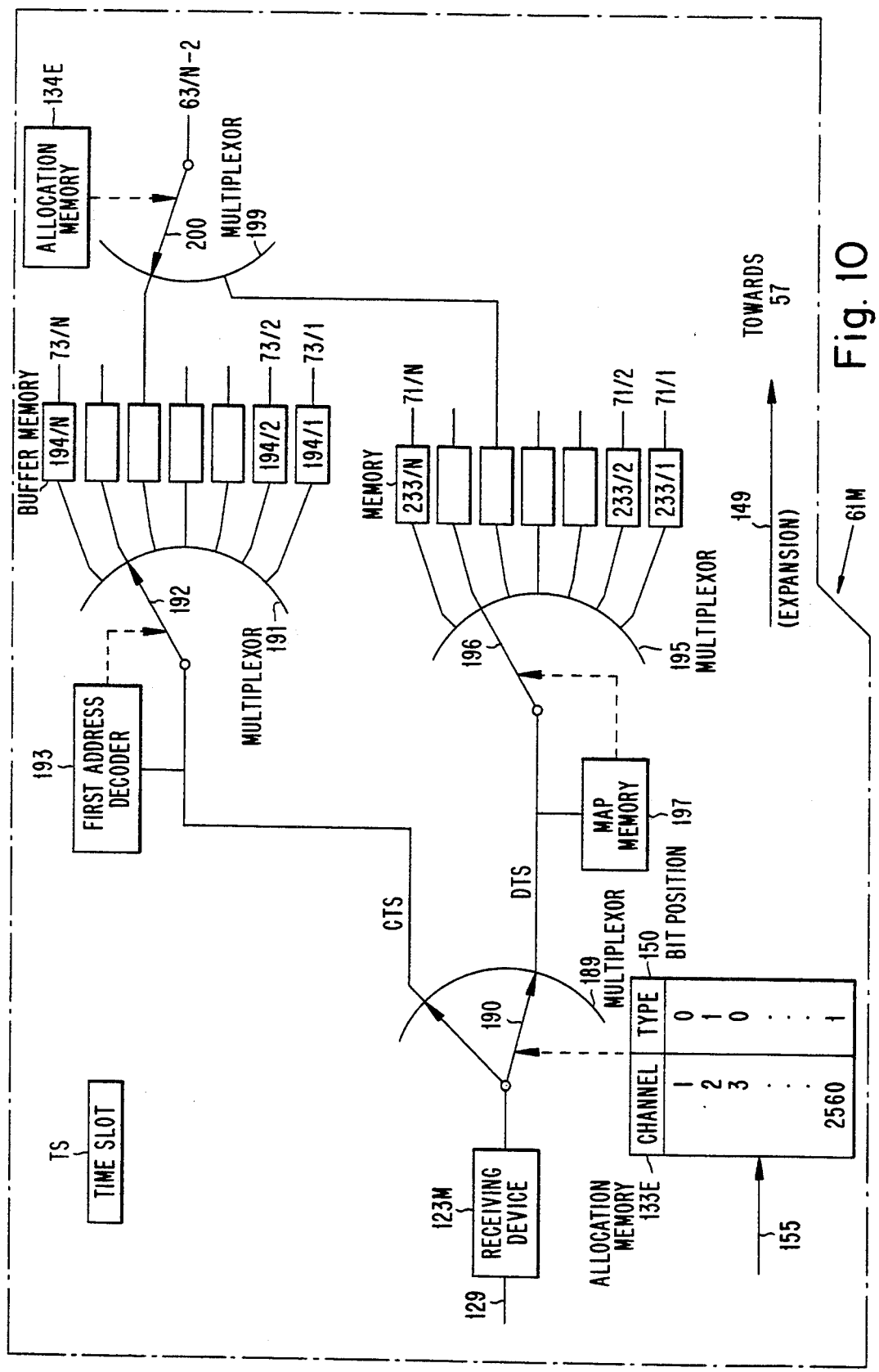

FAST OPERATING PROGRAM CONTROLLED DIGITAL UNISWITCH

TECHNICAL FIELD

The present invention relates to a fast operating switch for establishing connections between a plurality of units which are distributed locally within a system and which are mutually connected by means of physical links. One of these units, called the switch core, includes a known circuit switch for establishing circuit-switched connections. The circuit switch includes incoming ports, outgoing ports and control memories which define which of the incoming ports shall be connected to which of the outgoing ports in establishing the routes of the circuit-switched connections through the switch. The circuit switch is of the TS-type (Time Space type) and includes the same number of control memories as the number of links connected to the switch core. The circuit switch also includes switch memories which are utilized to connect the incoming port of a connection to the outgoing port of the same connection. The number of switch memories present equals the number of links squared.

The inventive switch can also be used as a digital cross-connector.

BACKGROUND ART

In the case of one known telecommunication network, the terminal units are connected to the switch by means of a number of links. Various means, such as subscriber lines, tone-code receiving circuits, ring generators, etc., are connected to the terminal units. A regional processor monitors several terminal units and is connected to said units via separate signal lines. Another regional processor monitors other terminal units and is connected with these units via separate signal lines. Thus, the system includes a number of regional processors which monitor the activity of the terminal units. A regional processor also monitors the activity of the switch. The regional processors are connected by means of a signal bus line to a main central processor which controls the telecommunication network and which also controls the establishment of a connection through the switch on the basis of a subscriber-number list stored in the memory of the central processor. When a connection is to be established between two subscribers, line signalling is effected via the aforesaid signal lines, also called signal links, whereas the actual transfer of information, i.e. speech in the case of a speech connection or the transmission of digital data when two computers communicate with each other, is effected via those links which enter the switch from respective terminal units.

Each terminal unit has a local processor which monitors the activity of the devices or means connected to the terminal unit. When one device in a terminal unit wishes to establish a connection through the switch to a device in another terminal unit, the local processor signals a request to be connected to its regional processor, which in turn signals the request to the central processor, which carries out a number analyses and assigns idle multiple positions in the switch to the two devices.

One drawback with this known telecommunication system is that separate signal links are required downstream of the line terminating circuits. Communication equipment for signalling over the signal links is also required, in addition to the signal links. The signal links are expensive in themselves and require separate maintenance. Those links over which information is transmitted must also have their own communication equipment and also need to be maintained individually. The two information-transmission and line-signalling communication systems must be adapted so that they will function together.

When using known circuit switches, it takes a relatively long time to establish and release, or terminate, a connection. It can be mentioned by way of example that the time taken to establish a connection and to terminate said connection are each in the order of 10 milliseconds. This is disadvantageous when only a small amount of information is to be transmitted over the circuit-switched connection. When the connection is established between two processors and one of the processors is intended merely to send a confirmation signal to the other processor, the time taken to set-up the connection and to terminate the connection is relatively long in relation to the connection data phase, i.e. the time taken to transmit the information from one processor to the other.

Another drawback with the known switch is that the devices and terminal units connected thereto are allocated a fixed bandwidth which cannot be changed without undertaking comprehensive modification of the terminal units.

DISCLOSURE OF THE INVENTION

One object of the present invention is to provide a program-controlled digital switch which uses the same links for signalling as those used to transmit information.

Another object of the invention is to provide a switch of the kind described in the introduction in which a unit to which a predetermined bandwidth has been allocated can be readily allocated a new bandwidth that is different to the predetermined bandwidth. This will enable the bandwidth to be adapted to the bandwidth requirements of the unit.

A further object of the invention is to provide a fast operating program-controlled digital uniswitch (universal switch) in which the time taken to establish a circuit-switched connection and the time taken to release said connection is extremely short, in the order of 13 microseconds or shorter.

Yet another object of the invention is to provide a switch in which the time slots are of two kinds, to wit data-time-slots and control-time-slots. The control-time-slots are transported in a packet-switched network in the switch and are used, among other things, to initiate the establishment and release circuit-switched connections, whereas the data-time-slots are used to transmit information on the circuit-switched connections.

Still another object of the invention is to provide a switch which includes a number of multiplexing devices for multiplexing the stream of time slots on respective links in mutually different ways, corresponding to the type of time slot concerned, more specifically in a manner such that the data-time-slots are multiplexed framewise while the control-time-slots are multiplexed packet-wise.

Another object of the invention is to provide a switch which will enable each distributed unit to manoeuvre or operate on the switch itself.

Another object of the invention is to provide a switch of the aforedescribed kind in which a unit connected to the switch is able to establish a connection between two further terminal units connected to the switch.

Another object of the invention is to provide a switch in which each unit connected to a link is allocated at least one control-time-slot. This will enable each unit to manoeuvre the circuit switch directly in response to a command sent on the control channel formed by the said control-time-slots in the packet-switching network, when initially starting the switch, i.e. when the switch is powered on.

Another object of the invention is to provide a switch of the aforesaid kind in which a unit that has been allocated a predetermined bandwidth, and therewith a predetermined number of control-time-slots and data-time-slots per frame, will be able to continually change, during switch operation, the proportions between the bandwidth utilized for signalling purposes and the bandwidth utilized for the transmission of information. According to the invention, this is achieved by changing the distribution of data-time-slots and control-time-slots within the predetermined number of time slots per frame.

Another object of the invention is to provide means whereby those time slots at the disposal of a unit are able to change type, i.e. to change from a control-time-slot to a data-time-slot and from a data-time-slot to a control-time-slot, respectively.

Another object of the invention is to provide a switch of the aforedescribed kind which will enable the time slots on the links to be type-marked, such that each time slot will carry information which discloses its identity, e.g. whether it is a control-time-slot or a data-time-slot.

Another object of the invention is to provide a switch of the aforedescribed kind which will enable the time slots on the links to be type-marked, so as to enable the time slots to be of any dedicated type whatsoever.

The invention also relates to a switch of the aforedescribed kind where the time slots carry no identity information, but where time-slot identity is, instead, stored in allocation memories which coact with means for transmitting and receiving time slots on a link.

Those features characteristic of the present invention are set forth in the following Claims.

BRIEF DESCRIPTION OF THE DRAWINGS

The present invention will now be described in more detail with reference to a number of exemplifying embodiments thereof illustrated in the accompanying drawings, in which FIG. 1 is a block schematic illustrating a known telecommunication network which utilizes separate signal links for signalling purposes;

FIG. 2 is a simplified block schematic of the inventive switch, where all links are used both for signalling and for the transmission of messages;

FIG. 3A illustrates a time slot comprised of several bits;

FIG. 3B illustrates a number of frames, each comprising a predetermined number of time slots, said frames being transmitted cyclically from one unit to another unit over a link;

FIG. 3C illustrates a message consisting of a number of data-time-slots, each being extracted from successive frames and each exhibiting one and the same position in successive frames;

FIG. 3D illustrates a control-packet-message transmitted from one unit to another; FIGS. 4A–4C illustrate bit patterns for the various flags used in the packet switch;

FIGS. 4D–4E illustrate a type-marked control-time-slot and a type-marked data-time-slot;

FIGS. 4F–4G illustrate an unmarked control-time-slot and an unmarked data-time-slot respectively, wherein the type-marking of respective time slots is stored in cyclically scanned memories located on each side of the link over which the time slots are transmitted;

FIG. 5 is time diagram illustrating how a circuit-switched connection is established and released with the aid of a command transmitted on the control channel;

FIG. 8 illustrates the terminal structure of the switch core, the switch terminal units and the terminal connection units in the distributed packet switch according to the invention;

FIG. 9 is a block schematic of a first embodiment of a multiplexing device for multiplexing time slots in an inward direction towards the switch core, wherein type-marking of the time slots is effected in a cyclically scanned allocation memory;

FIG. 10 is a block schematic of a first embodiment of a multiplexing device for demultiplexing time slots in an outward direction from the switch core, wherein type-marking of the time slots is effected in a cyclically scanned allocation memory;

DETAILED DESCRIPTION

Figure 6:
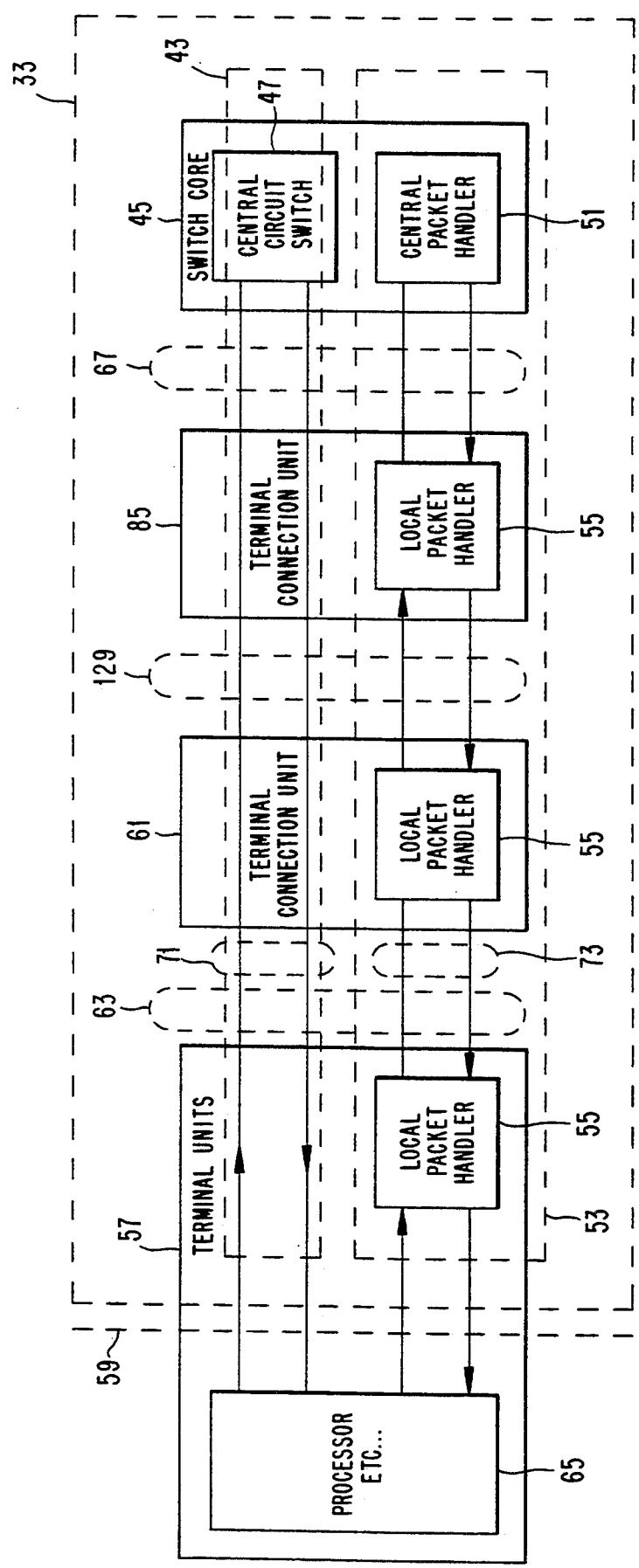
FIG. 6 is a simplified, logic block schematic of the combined packet and circuit switch according to the invention.

FIG. 1 is a simplified block schematic illustrating a known telecommunication network which includes a switch 1 to which terminals 3, 5 are connected via links 7 and 9 respectively. Each terminal has a number of devices connected thereto, such as standard telephones, data terminals, tone converting circuits, etc. The activities of respective connected devices are monitored by a local processor 11 at the terminal 3. A corresponding local processor 13 is provided at the terminal 5.

Regional processes 15, 17, 19 are connected to the terminals and to the switch 1 via signal links 21, 23, 25, and monitor the activities of the terminals and the switch respectively. The regional processors 15, 17, 19 are connected to a signal bus 27, to which a central processor 29 is also connected. The central processor has a data base 31 which includes numerical tables for subscribers and the like connected to the system. When subscriber A wishes to contact subscriber B, subscriber A lifts his telephone receiver and obtains a dialling tone, whereafter subscriber A dials the telephone number of subscriber B. A's activities are monitored by the local processor 11, which signals to the regional processor 15 that A has lifted his receiver. This is followed by dialling of the number, number analysis, reservation of a route through the switch 1 and transmission of a ringing tone to subscriber B. When subscriber B lifts his telephone receiver, a circuit-switched connection is established between the subscribers A and B through the switch 1, and the parties begin to converse. When one of the parties replaces his telephone receiver, this activity is detected by a corresponding local processor, which signals to the regional processor that the telephone receiver has been replaced. The regional processor, in turn, signals to the central processor 29 that the telephone receiver has been replaced and the central processor orders the connection to be released.

One drawback with this known telecommunication system is that separate signal links 21, 23, 25, 27 are required for signalling and that the transmission of messages is effected on separate links 7 and 9. The drawbacks represented by such signal lines have been described earlier on.

A further drawback with the known telecommunication system is that connected devices, such as the terminal unit 3 or 5 for instance, are unable to manoeuvre the switch 1 directly, and consequently all manoeuvering of the switch has to take place indirectly via the central processor 29. The disadvantage with this is that it takes a long time to establish the connection between A and B.

FIG. 2 illustrates schematically an inventive switch 33 and shows how the switch may be incorporated in a telecommunication network. Mutually corresponding components in FIGS. 1 and 2 have been identified with the same reference signs. A central processor 35, which is similar to the processor 29 and coacts with the data base 31, can be connected directly to the switch 33 over a link 37 in the same way as a terminal 3 or 5 is connected to the switch. The switch 33 is constructed as a combined circuit switch and a distributed packet switch. The circuit switch establishes circuit switched connections between units which are to communicate with one another, whereas the data-packet switch is distributed in a packet-switched network whose nodes include the aforesaid units, i.e. the switch 33, the terminals 3, 5 and the central processor 35. Each terminal unit is able to manoeuvre the switch 33 via the packet-switched network directly, without needing to go through a central processor.

By packet switching is meant that an addressed packet is sent in the packet-switched network and that the addresses are read in the routing nodes of the network. These routing nodes are spread in the network, as opposed to the case where the network has a central routing point to which all packets are directed. In accordance with the invention, the addressing structure of the switch is the structure described in our WO-A-92/05648 and assists in shortening the times taken to set-up and release a connection. The short time taken to set-up and release a circuit-switched connection is also influenced by other factors, which will be described herebelow and which are associated with the bandwidth assigned by the switch 33 to the various units connected to the switch. A further factor which makes the switch a fast operating switch resides in the possibility of enabling a transmitting unit to lay-out the whole of its data bandwidth requirement in response to solely one command. This possibility of expanding the bandwidth with solely one command directed to the switch is described in our Swedish Patent Specification 461 310.

Time-Slot Packets

Before describing the construction and modus operandi of the combined inventive switch, we will first describe certain fundamental principles concerning time slots and packet switching with reference to FIGS. 3A–3D and FIGS. 4A–4G.

FIG. 3A illustrates a data-time-slot DTS, which in the illustrated case is comprised of nine bits numbered B0, B1 ... B8, although it will be understood that the invention is not restricted to this example. An electric signal corresponds to each bit, wherein the signal may take a high or a low logic level. Bit B0 is transmitted first in time, and thereafter bit B1 and so on.

With the intention of illustrating how a message is transmitted from subscriber A to subscriber B, it is assumed in the following that time slot No. 3 is associated with the telephone of subscriber A. A number of time slots, each of which is associated with a respective telephone of the remaining telephones (not shown) and which is connected to the terminal unit 3, are sent in time sequence, one after the other. For instance, if eight subscribers are connected to the terminal unit 3, each subscriber is allocated or assigned a respective data-time-slot. The local processor 11 is also assigned a data-time-slot. Thus, a total of nine time slots are transmitted from the terminal 3. Time slots from other terminals (not shown in FIG. 2) are multiplexed in a manner described in more detail herebelow, together with the time slots from the illustrated terminal 3, and are transmitted on one and the same link 7. It is assumed in the FIG. 3B illustration that 2560 time slots are transmitted sequentially on the link 7. The time slots are organized in frames, where each frame is delimited by a frame-locking word R. These frames are also transmitted in time sequence on the link, one after the other. The mutual order between the time slots in a frame is maintained from frame to frame. In this way, a stream of frames are transmitted on one and the same link, with each frame consisting of a number of time slots. This bit stream is shown in FIG. 3B. Time slot No. 3 is shown in horizontal hatch.

If the message to be transmitted has, for instance, a length of 31 octets, 31 time slots are required to transmit the message. If A has only one time slot per frame at his disposal, the time taken to transmit the message will be equally as long as the time taken to transmit 31 frames. FIG. 3C illustrates a message comprised of time slot 3 which has been extracted from the frame stream shown in FIG. 3B.

A time slot which has a predetermined position in a frame can logically be understood to be a channel of the transmitting device A. In the preferred embodiment of the invention, one frame corresponds to 125 microseconds. The frame is divided into a number of time slots. The time slots can be treated as individual virtual channels. Time slots can be combined to form a virtual channel of larger bandwidth. The more time slots that are combined, the greater the bandwidth of the individual virtual channel.

Analogously, the time slots in position No. 3 in a sequence of frames can be said to form a channel over which subscriber A can signal. Correspondingly, the subscriber B can be assigned another time slot, for instance time slot No. 9 in a frame. In order to transmit information from A to B through the switch 1, it is necessary to copy the content of time slot No. 3 into time slot No. 9. This takes place in the circuit-switched part of the switch 33, in a known manner. The circuit-switched part of the switch functions as a conventional TS-switch. Compare "Telecommunication Telephone Network 2", Ericsson, Televerket and Studentlitteratur, 1987, Chapter 9. "Digital Switching Systems".

According to the invention, the time slots on the link 7 may be of two different kinds, namely data-time-slots and control-time-slots. Data-time-slots are illustrated in the exemplifying embodiment of FIGS. 3A–3C. A message is orientated frame-wise, meaning that the message is transmitted in octets, with one octet per frame in the illustrated case.

The packet formed by control-time-slots is referred to hereinafter as the control packet. All messages in the packet-switched network are transmitted in control-time-slots. The control-time-slots may be transmitted dispersed in time within a frame. All control packet messages are transmitted while held together logically, which means that control-time-slots from different control packets are not transmitted interleaved with one another. The control packets are thus packet orientated. The packets are not transmitted in the packet-switched network orientated in frames, which means that the control-time-slots in a packet message are not transmitted on predetermined time slots selected from among those control-time-slots allotted to a frame.

Information transmitted on the data channels is sent in data-time-slots. The packet messages on the data channels are transmitted frame-orientated, which means that the data-time-slots are transmitted on predetermined time slots chosen from among those data-time-slots assigned to a frame. Different packet messages can be transmitted time-wise interleaved in one another. As before mentioned, a device or unit can be allocated many time slots, i.e. several data channels. Because the bandwidth of a data channel can be expanded, i.e. increased, the capacity of the data connection can be considerably enhanced, therewith contributing to short data transmission times. A capacity measure of a connection is the number of channels from which the connection is comprised.

FIG. 3D illustrates a control packet message transmitted in the packet-switched network of the switch. The construction of this packet-switched network will be described in more detail below. The control packets are transmitted packet-orientated in this network, which means that immediately a unit in the switch wishes to transmit a control packet, or to receive a control packet, on a link, all control-time-slots in the control packet are sent to their destination unit, bit-by-bit in one and the same frame, until the whole of the control packet has been transmitted. The control packet includes start and end flags, address field, information field and destination flag, source flag and information flag. The manner in which this is achieved will be described with reference to the multiplexing that takes place in the packet handlers provided in the packet switch.
Bandwidth Assume that each frame consists of 2560 octets and that it takes 125 microseconds to send the complete frame. If a transmitting terminal has been assigned one time slot per frame and the message to be transmitted is four characters long, it will thus take 500 microseconds to transmit the message. If the transmitting terminal is, instead, assigned two time slots per frame, the terminal will take only 250 microseconds to transmit the same message, since two characters can be transmitted with each frame. If, instead, the transmitting terminal is allocated four time slots per frame, it will only take 125 microseconds to transmit the message. It will be seen from this simplified discussion that the more time slots that are allocated to a transmitting terminal, the greater the bandwidth at the disposal of the unit and the faster the unit is able to transmit a message.

FIGS. 4A, B and C illustrate characteristic bit patterns for those flags which are used in the packet-switched network in the switch in accordance with the invention. FIG. 4A illustrates characteristic bit patterns for a destination flag, an information flag, a source flag, an end-flag and a broadcast transmission flag. FIG. 4B illustrates an idle flag, i.e. a flag which is included to denote that a unit has no information to send. FIG. 4C illustrates different flow control flags, i.e. for controlling the flow of control packets between transmitting and receiving units. Such flow-controlling flags are conventional and will therefore not be described in detail. ACC signifies accepted acknowledgement that a control command has been received, HLD signifies hold, RTS signifies a request for transmission, and NAC signifies not accepted, i.e. something has been received but the purport is obscure, i.e. negative acknowledgement. The control-time-slots present in the packet switch have different areas of use. As before described, the control-time-slots can be used in connection with manoeuvering the circuit switch and they can also be used to configure the links included in the network served by the inventive switch. The control-time-slots may also be used to allocate bandwidths dynamically to connected units. The control-time-slots are also used for operating and maintaining the switch and are utilized, for instance, for transmitting error signals. The control-time-slots may also be used to identify switch connected units. The control-time-slots may also be used for configuring the switch connected units. Finally, the control-time-slots may also be used locally on one single link for controlling the flow of packets transmitted on the link.

The distributed packet switch, which is described below and which is included in the inventive switch, has concentration and expansion points. Signals arriving from incoming links are multiplexed in a concentration point to a single outgoing link, while the reverse occurs in an expansion point, i.e. the signals arriving from one single incoming link are demultiplexed and distributed on several outgoing links. It is beneficial economically to divide the links into different speed classes in a manner such that those links which are located nearest the switch will have high bit speeds on the link, whereas those links that are located furthest from the switch have a low link bit speed. Intermediate links have a third bit speed which is lower than the highest bit speed but higher than the lowest bit speed.

According to one preferred embodiment of the invention, the links are divided into the following standardized speed classes. The frame frequency of 8 kHz applies to all speed classes.

| Speed Class | USI2 | USI3 | USI4 |
|---|---|---|---|
| Line speed | 8.192 | 61.44 | 184.32 |

| Speed Class | USI2 | USI3 | USI4 |
|---|---|---|---|
| Mb/s Transport speed Mb/s | 7.232 | 49.152 | 163.84 |
| Time slots/frame | 113 | 768 | 2.560 |

By line speed is meant the link bit speed. The reason for using several speed classes is because it is cheaper to use lower-speed links when only a moderate amount of information shall be transmitted. As an example of what is meant by moderate information quantities, it can be mentioned that a line board for standard telephones has eight channels and one local processor. This device thus has a requirement of $9 \times 64$ kb/s $= 576$ kb/s, whereas the central processor 29 may require up to 13 Mb/s for signalling to the switch.

FIGS. 4D–4E illustrate control and data-time-slots for the speed class USI4, wherein, in accordance with the invention, the time slots are provided with a marker bit which identifies the time slot as being either a data-time-slot or a control-time-slot. The marker bits are marked with broken lines. FIGS. 4F–4G illustrate respectively a control-time-slot and a data-time-slot with which no marker bits are used.

The Establishment of a Connection Between A and B

The following simplified description refers to FIG. 2. The sole intention is to illustrate the interplay between circuit-switched connections and packet-switched connections when establishing a telephone connection between two parties A and B, of which A is the calling party and B is the called party. The links 7 and 9 may have a bandwidth according to USI2, USI3 or USI4, of which only 64 kbit/s is used for a telephone call. A telephone call needs only one time slot per frame in order to achieve satisfactory speech quality. When subscriber A wishes to call subscriber B, subscriber A lifts his telephone receiver. The act of lifting the telephone receiver is detected by the local processor 11. the local processor 11 sets-up a first circuit-switched connection with the central processor 35, with the aid of the control channel. By circuit-switched connection is meant a virtual channel in which data-time-slots are transmitted. The information that subscriber A has lifted his telephone receiver is transmitted on the first circuit-switched connection. The central processor 35 shall now ensure that subscriber A obtains a dialling tone. Accordingly, the central processor 35 now switches a tone receiver 39 to subscriber A. The tone receiver 39 is coupled to the switch 33 in the same manner as the unit 3, 5, 35. The tone receiver is coupled to subscriber A in response to the central processor 35 transmitting, over the control channel, a command ordering the establishment of a second circuit-switched connection between subscriber A and the tone receiver 39. This command is sent to the switch 33. A dialling tone is now sent to subscriber A, over the second circuit-switched connection. When subscriber A hears a dialling tone, he dials subscriber B's telephone number. The digits dialled are sent over the second circuit-switched connection to the tone receiver 39, which analyzes the digits. The digits analyzed by the tone receiver as those digits that subscriber A has dialled shall now be sent from the tone receiver to the central processor 35. The tone receiver organizes this by sending on the control channel a command ordering the establishment of a third circuit-switched connection between the tone receiver and the central processor. The tone receiver then transmits the aforesaid digits, i.e. the telephone number, to the central processor 35, over the third circuit-switched connection, therewith informing the central processor that subscriber A has dialled the aforesaid digits. The central processor 35 now performs a number analysis and finds that subscriber A shall be connected with subscriber B and that a ringing signal shall be sent to subscriber B. In order to organize this, the central processor 35 sends, over the control channel, a command to the switch 33 concerning the establishment of a fourth circuit-switched connection between subscriber A and subscriber B by sending to the switch, together with said command, information concerning the multiple positions of the subscribers A and B in the switch 33. The switch 33 now establishes the ordered fourth circuit-switched connection between A and B, by connecting time slots on link 7 with time slots on link 9, in a known fashion. The central processor 35 then sends to the switch 33, on said control channel, a command which instructs the switch to create a fifth circuit-switched connection to the local processor 13 at B's terminal 5, so as to send to the local processor 13 on this connection a command to organize the transmission of a ringing signal to B. A local device, which is situated at the terminal unit 5 but which is not shown in FIG. 2, sends a ringing signal to B in response to a command from the local processor 13. The ringing signal is interrupted when subscriber B lifts his telephone receiver, this interruption being organized locally by the local processor 13. Subscriber A is then connected with subscriber B via the fourth circuit-switched connection. The ensuing conversation is now transmitted in a data channel on this fourth circuit-switched connection, said data channel being formed by a data-time-slot.

The above simplified description describes an example of how a connection is set up. The various time points at which the circuit-switched connections are released have not been described. It will be understood that the sequence in which the various activities take place may be different to that described. When subscriber A and subscriber B represent two processors between which data information shall be transmitted, the bandwidth is greater than one time slot per frame.

FIG. 5 illustrates a time diagram illustrating the mechanism used to set-up or release one of the aforesaid circuit-switched connections with the aid of a control packet. A time axis is shown at the bottom of the Figure. As will be explained in more detail below under the section entitled "Configuring of the Links", the inventive switch includes a control channel on which the aforesaid control packets are transmitted. The inventive switch also includes a number of data channels. FIG. 5 illustrates a data channel which thus consists of one or more time slots and which passes between a transmitting unit, shown to the left of FIG. 5, and a receiving unit, shown to the right of FIG. 5. When the transmitting unit wishes to establish a connection, it first transmits a control packet 32 through the control channel. The control packet contains the command "request to establish a circuit-switched connection". The control packet passes to a switch core, described in more detail herebelow, which upon receipt of the control packet 32 establishes a circuit-switched connection between transmitting and receiving unit and transmits back a control packet 34 containing an acknowledgement of the establishment of a connection route. This connection route is realized with the aid of the illustrated data channel.

Data is then transmitted between transmitting and receiving units, as signified by block 36. Naturally, the time taken to complete this data transmission process will depend on the amount of information to be transmitted. Upon completion of the data transmission process, a request is sent for the release of the circuit-switched connection. This release request is sent in a control packet 38, which passes to the central core of the switch on the control channel. When the switch core has released the connection, an acknowledgement 40 to this effect is sent on the control channel. This acknowledgement 40 is sent to the unit that requested release of the connection. The circuit-switched connection is then broken. The times taken to establish and to release a circuit-switched connection can be dimensioned by the number of control-time-slots allotted. The number of allotted or allocated control-time-slots, i.e. the length of the control phase in FIG. 5, will preferably be in relation to the length of the data phase. The time for a control phase can be made shorter than 10 microseconds. It will be seen from FIG. 5 that the control packet for establishing a route through the switch must be sent and confirmed before transmission of the actual data information can commence.

Construction of the Switch

FIG. 6 is a block schematic showing that the inventive switch 33 includes a circuit switch 43 which coacts with a packet switch 53. The packet switch 53 includes a central packet handler 51 and a number of geographically dispersed local packet handlers 55. The circuit switch 43 includes a central circuit switch 47 and a multiplexing stage (not shown). The central packet-handler 51 forms together with the central circuit switch 47 a switch core 45. The local packet-handlers 55 are located on different terminal units. The terminal units that are distal from the switch core are called switch terminal units 57 or plainly and simply terminal units which enable devices and units such as processors, line boards, tone conversion circuits, etc., generally referenced 65 in FIG. 6, to be connected via interface 59. Terminal connection units 61 and 85 are located between the switch terminal units 57 and the switch core. A link 63 is provided between a switch terminal unit 57 and a terminal connection unit 61, and a further link 129 is provided between a terminal connection unit 61 and a terminal connection unit 85. Correspondingly, a further link 67 is provided between the terminal connection unit 85 and the switch core 45. As will be seen from FIG. 6, the links are divided logically into links for control-time-slots and data-time-slots respectively. The logic links for data-time-slots are referenced 71 and the logic links for the control-time-slots are referenced 73. It will be understood, however, that the logic links 71, 73 are physically one and the same link 63. Correspondingly, the links 129 and 67 are each divided into a logic link for control-time-slots and a logic link for data-time-slots.

Figure 7:
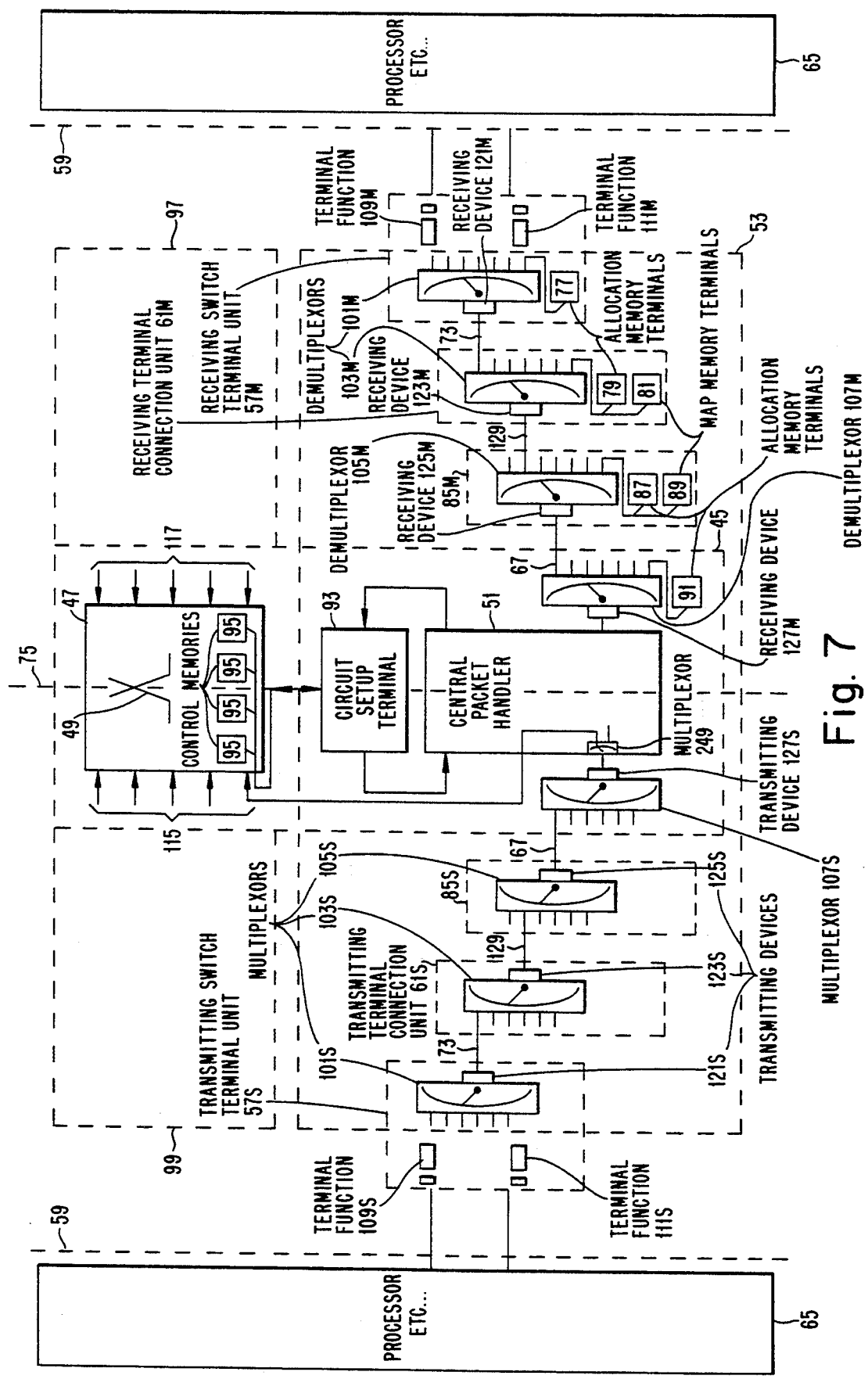
FIG. 7 is a detailed logic block schematic of the switch illustrated in FIG. 6.

FIG. 7 illustrates the logic construction of the inventive switch. By logic is meant that the packet switch 53 can be considered as being divided symmetrically into a transmitting side and a receiving side, the symmetry line being shown by the broken line 75. For instance, the left switch terminal unit 57 in FIG. 6 is comprised of a transmitting switch terminal unit 57S in FIG. 7 and a receiving switch terminal unit 57M in FIG. 7. The units 57S and 57M are mounted on one and the same physical component board. Correspondingly, the terminal connection unit 61 on the left of FIG. 6 is shown as though it comprised a transmitting terminal connection unit 61S and a receiving terminal connection unit 61M in FIG. 7. Thus, that part which lies on the right of the symmetry line 75 in FIG. 7 can conceivably be lifted from the plane of the Figure and folded over the line 75 and placed over the left half of FIG. 7, so that 57M will lie on top of 57S for instance. The receiving switch terminal unit 57M has an allocation memory terminal 77. The receiving terminal connection unit 61M has another allocation memory terminal 79 and a map memory terminal 81. The terminal connection unit 85M has an allocation memory terminal 87 and a map memory terminal 89. The switch core 45 has on the receiving side an allocation memory terminal 91. The switch core also includes a circuit setup terminal 93, which is described in more detail below under the heading Addressing.

Similar to FIG. 6, the data-time-slot circuits of the multiplexing and demultiplexing stages of the circuit switch 43 have not been shown in detail in FIG. 7. These not-shown multiplexing and demultiplexing stages are located in the units 57, 61 and 85 and have a folded structure similar to the multiplexing and demultiplexing stages for the control-time-slots. The multiplexing and demultiplexing circuits of the data-time-slots are shown schematically in FIG. 7 at the broken-line rectangles 97, 99.

The switch terminal unit 57 of the packet switch 53 includes on the transmitting side a multiplexing stage 101S and on the receiving side a demultiplexing stage 101M, as shown in FIG. 7. The terminal connection unit 61 has on its transmitting side another multiplexing stage 103S and on its receiving side a demultiplexing stage 103M. The terminal connection unit 85 has on its transmitting side a multiplexing stage 105S and on its receiving side a demultiplexing stage 105M. The switch core 45 has a multiplexing stage 107S on its transmitting side and a demultiplexing stage 107M on its receiving side. Each switch terminal unit 57 has a number of terminal functions referenced 109–111. These functions are referenced 109S . . . 111S on the transmitter side and 109M . . . 111M on the receiver side. A number of switch terminal units 57 may be connected to a terminal connection unit 61, as indicated by the dash lines projecting from the multiplexing stages, and correspondingly a number of terminal connection units 61 may be connected to a terminal connection unit 85, as indicated by the dashed lines projecting from the multiplexing stage 105. In turn, several terminal connection units 85 may be connected to the multiplexing stage 107 of the switch core, as indicated by the dashed line projecting from the last-mentioned stage. The same applies to the demultiplexing stages on the receiver side.

The central circuit switch 47, which is of a kind known per se, includes a number of switch memories 49 and a number of control memories 95. The central switch 47 also includes a number of incoming ports 115 and a number of outgoing ports 117. The central switch 47 includes the same number of control memories 95 as the number of that are links connected to the central switch 47. The switch memories 49 are symbolically shown by the crossing lines in FIG. 7 and are comprised of memory modules, the numbers of which equal the number of links squared, more specifically the number of links connected to the circuit switch. When a circuit-switched connection is to be established, a control packet arrives at the circuit setup terminal 93 on the packet channel. This control packet contains all data required for setting-up the central circuit switch 47. When the circuit-switched connection has been well established by the circuit setup terminal 93, the data information is transmitted on the data channel 71 (FIG. 6) directly to the memory 49 of the circuit switch. A return address is built on the control packet which arrives from the unit that requested the establishment of a circuit-switched connection. This return address is built-up by the multiplexors 101, 103, 105. The return address is used to send an acknowledgement to the unit which requested the establishment of the connection. This acknowledgement is sent over the packet channel. It should be observed that the unit which requested establishment of a circuit-switched connection does not necessarily need to be concerned with the connection in question and the connection may concern some other unit. The acknowledgement discloses to the requesting unit that the called unit is idle or free. If the called unit is busy, there is obtained another form of acknowledgement disclosing that the unit is busy.

The switch terminal unit 57 includes a transmitting device 121S and a receiving device 121M. Correspondingly, the terminal connection units 61 and 85 and the switch core 45 each include respective transmitting devices 123S, 125S, 127S and respective receiving devices 123M, 125M and 127M. These transmitting and receiving devices are built together on one and the same board.

FIG. 8 illustrates an exemplifying embodiment of the terminal structure of an inventive switch. The terminal structure illustrated in FIG. 8 is not outwardly extended as in the FIG. 7 embodiment and the transmitting side and the receiving side of each terminal is shown as an integral unit. The devices on the transmitting side are able to transmit in an inwards direction towards the switch core, called the concentration direction, and also in an outward direction away from the switch core, called the expansion direction. Devices on the receiving side are able to receive signals on routes directed in towards the switch core and signals on routes directed away from the switch core.

In addition to the units described hitherto, the allocation memory terminal 77 also includes an allocation memory 131. Each allocation memory terminal 79, 87 and 91 includes two allocation memories; the terminal 79 includes the allocation memories 133, 134, the terminal 87 includes the allocation memories 135, 136 and the terminal 91 includes the allocation memories 137, 138. Each map memory terminal 81, 89 also includes a respective map memory 139, 141. FIG. 8 illustrates how the switch can be implemented in practice. The link 67 is shown to enter the switch core 45. The link 129 extends between the terminal connection units 61 and 85. In practice, 96 physically different links which are connected to the switch core. Each terminal connection unit 85 terminates, in turn, two terminal connection units 61, and in practice 192 different terminal connection units 61 and 97 different terminal connection units 85 are included. Each terminal connection unit 61 terminates, in turn, 12 different links 63. Thus, the embodiment illustrated in FIG. 5 includes 2,304 different switch terminal units 57. It will be understood, however, that the number of connected switch-connection units and terminal connection units may be different to the aforementioned number and that the invention is not restricted to the FIG. 8 embodiment.

Configuration of the Links

Starting-up of the switch and the configuration of the switch links is handled by a processor 145, shown in FIG. 2. The processor 145 is connected to the switch 33 via a link 147. In principle, the processor 145 may comprise part of the central processor 35, although for the sake of clarity, it has been shown as a separate unit. The processor 145 contains a starting-up program which is stored in a ROM memory, not shown. The processor 145 polls each unit that is connected to the switch links via the packet channel, and asks the unit to identify itself so as to provide the processor with information relating to the type of unit polled and the bandwidth requirement. This information is required when configuring the link. The units send their reply messages to the processor 145 over the packet channel, while using the return address that is built onto the control packet along its route to the polled unit. A reply message may, for instance, be comprised of the identity of the polled unit in code, for instance a number of alphanumeric characters. The processor 145 translates the code and on the basis thereof is able to decide the type of equipment represented by the unit and how the unit shall be configured. The processor 145 is now able to send a configuring packet to the terminal connection units which serve the polled unit, so as to adapt the terminal connection units to the data bandwidth requirement of the polled unit. The configuring information is comprised of the number of control-time-slots assigned to the unit and this number is stored in the allocation memory of the unit. The configuring information also comprises the number of data-time-slots assigned to a unit and also information concerning the positions that the data-time-slots shall have in a frame. Those units which are then configured are the allocation and map memories in the terminal units.

In order to enable the links robe configured at all, it is necessary that each unit connected to the switch links is allocated initially at least one control-time-slot so that the processor 145 can actually reach all connected units. Consequently, the actual configuring process will proceed slowly at the beginning, but when the connected units have been allocated control-time-slots and data-time-slots, the units can begin to transmit with the allocated bandwidth, resulting in rapid switch operation. The device by means of which each unit is initially allocated at least one control-time-slot is described below with reference to FIG. 13.

Changing Bandwidth

As before mentioned, when using old mechanical switches, it takes some milliseconds to establish a connection between two subscribers. When the ensuing conversation is lengthy, in the order of minutes, the fact that a relatively long time is taken to establish the connection is unimportant. On the other hand, when the connection is established for communication between two processors where the message to be transmitted may have a length corresponding to 50–100 characters, the fact that the connection takes several milliseconds to establish is highly unsatisfactory when bearing in mind that the time taken to transmit the message is only some ten microseconds. It is therefore desirable that the time taken to establish and release a connection is in parity with the data transmission time. When configuring the links, the processor 145 assigns to the connected units a bandwidth which corresponds to the requirements of the unit. The allocation memory stores the distribution between data-time-slots and control-time-slots within the total number of time slots assigned to the unit. When a connected unit wishes to change the proportional distribution between control-time-slots and data-time-slots, the unit sends a corresponding request to the processor 145 on the packet channel.

The configuration of a link must be changed when new units are connected to the link. The processor 145 detects those devices which are connected to the links of the switch at a predetermined periodicity. If the processor 145 detects that a new device or unit has been connected to a link, the processor 145 will order information concerning the identity of said device or unit and reconfigures the link to which the new unit has been connected.

As described in the aforegoing, the bandwidth of a connection increases with the number of time slots at the disposal of a connected unit. Thus, the bandwidth of a unit is determined by the total number of time slots allocated to said unit and also to the proportional distribution of data-time-slots and control-time-slots.

Addressing

The following passages refer to FIG. 7, which illustrate an exemplifying embodiment of a network in which the inventive switch is included. It will be understood that network configurations different to the illustrated configuration can apply, and consequently the invention is not restricted to the illustrated network.

The fundamental addressing principle applied in the packet switch is that all packets which lack a destination address shall be addressed to the circuit setup terminal 93. Other packets which have a destination address are routed through the switch nodes in the illustrated network. When a packet which is on route to the switch core passes a node, the node sends the packet further. As the packet is sent further on its way, the node adds the address to the link from which the packet arrived, such as a tail on the existing sender address. When the packet arrives at its destination, a receiving device reads the full source address and thereby obtains knowledge of the source that dispatched the control packet. When the packet on route away from the switch core passes a node, the node analyzes the address and deals with the packet itself in that instance when said packet was addressed to this particular node. In other cases, the node strips from the destination address the address of the link to which the packet shall be sent. This addressing process is described in our WO-A-92/05648.

Multiplexing

A switch terminal unit or a terminal connection unit includes a number of incoming bidirectional links and an outgoing bidirectional link—seen in the direction of transmission from a terminal unit to the switch core. The outgoing link has a maximum bandwidth which is determined by the type of link concerned and it is possible to set the proportional distribution between data-time-slots and control-time-slots within this maximum bandwidth. In order to utilize effectively those control-time-slot bandwidths available to the outgoing link, there is applied in accordance with the invention an efficiency principle which is appropriate for the control-time-slots on the incoming links. The nature of this efficiency principle is such that those control-time-slots which are not used, i.e. control-time-slots which are allocated to a unit but which are empty and not used to transmit information, are discarded and not multiplexed over to the outgoing link in towards the switch core. Thus, not all of the control-time-slots on the incoming links are multiplexed over to the outgoing link.

All data-time-slots on all incoming links must be multiplexed over to the outgoing link in order not to lose data.

In order to illustrate multiplexing of data-time-slots and control-time-slots when the time slots are moving towards the switch core (concentration), FIG. 9 illustrates by way of example the multiplexing stage 103 in the terminal connection unit 61S. The transmission direction is given by the direction of the arrow 149. As before mentioned, in the illustrated example, the terminal connection unit has twelve physically separated incoming links. Only one of these, namely the link 63, is shown in FIG. 9. Belonging to each incoming link is a first multiplexor 153 which demultiplexes the control-time-slots and the data-time-slots. It is assumed in FIG. 9 that the time slots themselves lack type-marking. The type-marking of the time slots is, instead, stored in a memory, in the illustrated case the allocation memory 134K. The suffix K stands for concentration and is explained in more detail below with reference to FIG. 11. For the purpose of storing type-markings, the allocation memory 134K has a separate bit-position 150 which denotes the type of time slot concerned, for instance 0 indicates that the time slot is a control-time-slot and 1 indicates that the slot is a data-time-slot. The multiplexor 153 has a switch arm 157 whose position is controlled by the content of the aforesaid type-identifying bit-position in the allocation memory. An address pointer, symbolically shown by an arrow 155, in the allocation memory is set to memory position 1 by the frame-locking word. When the first time slot arrives, the type of time slot concerned is identified by the address pointer. When the time slot is a control-time-slot, represented by 0, the switch arm 157 is set to position CTS1 which leads into a first memory 161/1 of the type first-in-first-out (fifo-memory). If the time slot is a data slot, the switch arm 157 is set to position DTS1, which leads to another memory 163/1 of the same type as the memory 161. The address pointer 155 then steps down to the next memory position 2 and the next following time slot, time slot number 2, in the frame is analyzed to establish whether the time slot is a control-time-slot or a data-time-slot. This procedure of setting the switch arm 157 is repeated with every time slot until all of the 2560 time slots contained in the frame have been examined. The remaining memories 161/2 . . . 161/n, 163/2 . . . 163/n in FIG. 9 belong to corresponding (not shown) multiplexors in remaining links, in this case eleven links, in the general case N-1 links, where N is any selected integer, which are connected to the terminal connection unit 61S. Provided on the input of each memory 161 is a port monitor 187 which detects the start-flag and the end-flag of a respective control packet. The memories 161 form inputs to a second multiplexor 165 having a switch arm 167, and the memories 163 form inputs to a third multiplexor 169 having a switch arm 171. The memories 161 have a depth which accommodates the length of a packet. The switch arm 171 of the third multiplexor 169 is controlled by the map memory 139. The output of the second multiplexor 165 and the output of the third multiplexor 169 pass to a fourth multiplexor 181 whose output is formed by the next following link 129. The fourth multiplexor 181 has a switch arm 183 which is controlled by an allocation memory 133K. The suffix K denotes a concentration direction also in the case.

The second multiplexor 165 is controlled by whether or not a control packet is stored in one of the memories 161. As before mentioned, the control packets are not frame-orientated, which means that when a control packet is present on an incoming link 63, the port monitor 187 serving the memory 161 of a corresponding link will detect the start flag of a control packet and in response hereto open to provide access to its memory 161 and remain open until the end-flag of the control packet is detected. The whole of the control packet is stored in the relevant memory 161 during this port-open time. When a complete control packet has been stored in the relevant memory 161, the port monitor generates a signal flag which indicates that the control packet is complete and ready for further transmission to its destination address. The second multiplexor 165 continuously scans all memories 161 and when a signal flag is detected stops the switch arm 167 in a corresponding position in the multiplexor and remains in this position until the whole of the packet has been read and sent on its way.

The third multiplexor 169 multiplexes the same data-time-slots, time slot by time slot, under the control of the map memory 139, which keeps an account of the position of the time slots in the frame. Both memories 133K and 139 are controlled by time slot counters (not shown) present on the outgoing link 129.

The allocation memory 133K in the terminal connection unit 61 has the same content as the allocation memory 136K in the terminal connection unit 85 and continuously receives, for instance, via the packet channel, any changes that take place in the allocation memory 136K in the terminal unit 85.

The map memory 139 discloses from which memory 163 the data-time-slot which is to be transmitted on the link 129 shall be taken. The switch arm 167 scans the buffer memories 161 cyclically. If no information is to be sent, an idling pattern is transmitted. The scanning procedure is stopped immediately a signal flag is detected and the whole of the control packet is transmitted in a sequence on the available control-time-slots.

FIG. 10 illustrates the multiplexing stage 103M in the terminal connection unit 61M in the case when the time slots TS are not type-marked. In this case, the transmission direction is the reverse of that in FIG. 9 and the time slots on the link 129 are expanded in the multiplexing stage 103M. A first multiplexor 189 is seated on the receiving side of the link 129 and has two outputs CTS and DTS for control-time-slots and data-time-slots respectively. The multiplexor 189 has a switch arm 190 which is controlled by the content of the allocation memory 133E. The suffix E signifies expansion direction. The address pointer 155 is stepped forwards through the memory positions with the aid of a time slot counter (not shown), and reads each incoming time slot to determine whether the time slot is a control-time-slot or a data-time-slot, by looking at the content of a corresponding bit position 150. If the incoming time slot is a control-time-slot, the time slot passes to a second multiplexor 191 having a switch arm 192 which is set to different positions corresponding to different outgoing links 73/1 . . . 73/N (c.f. FIG. 6). The consumed part of the destination address is stripped off before a first address decoder 193 sets the switch arm 192 to a position corresponding to the link which goes to the destination address given on the removed address part. Reference numerals 194/1, 194/2, etc., denote buffer memories of the type first-in-first-out (fifo-memories) in which the control-time-slots are stored prior to being transmitted further.

If the received time slot is a data-time-slot, it is passed to a third multiplexor 195 having a switch arm 196. The third multiplexor has outputs which are connected to a respective outgoing link 71/1, 71/2 . . . (c.f. FIG. 6). A map memory 197 sets the switch arm 196 on the link given in the map memory. The content of the allocation memory 133E on the incoming side of the link 129 in FIG. 10 is controlled by the content of an allocation memory 196E in the terminal unit 85 on the transmitter side of the link 129. The allocation memory 136E can transfer its content to the allocation memory 133E over, for instance, the control channel. This guarantees that the content of the memories 133E and 136E coincide with one another.

The time slots in the memories 194, 233 are multiplexed together link-wise. To this end, there is provided for each link 71/1 . . . 71/N, 73/1 . . . 73/N a respective multiplexor 199 having a switch arm 200 which is controlled by an allocation memory 134E which contains information concerning the type of each time slot. FIG. 10 illustrates solely the multiplexor 199 for the links 71/N-2, 73/N-2. The content of the allocation memory 134E is copied from the allocation memory 131E, for instance by transferring the memory content on a control channel.

It will thus be evident that when the time slots lack a type-marking, those devices which keep an account of the type of time slots concerned comprise two allocation memories, in the illustrated case memories 134E and 131E, which coact with one another. Each memory includes a list of each of the time slots in the frame and each memory position has a separate bit position 150 which denotes the type of time slot.

Figure 11:
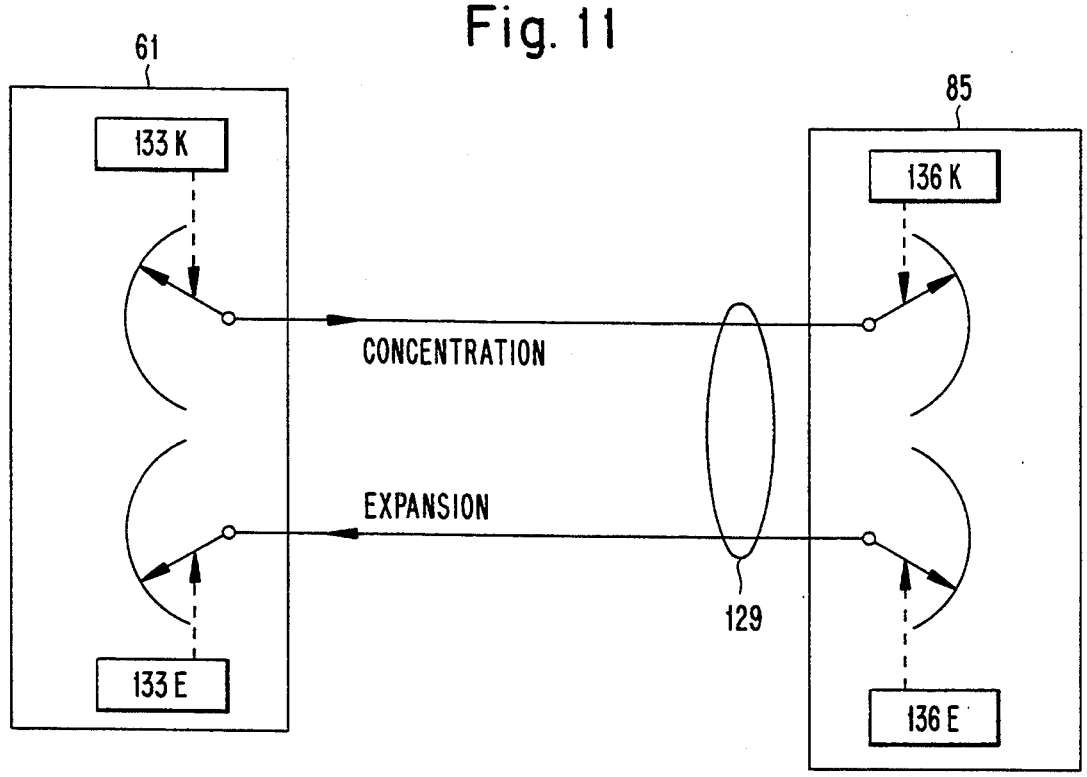
FIG. 11 is a block schematic which illustrates allocation memories when transmitting and receiving ends of a link, both in the expanding and the concentrating direction of the switch.

Because FIG. 8 does not show the terminal structure in an unfolded form, it is not possible to show the allocation memories 131, 133, 135, 137 and 134, 136 and 138 separated from one another. In fact, each allocation memory can be separated into two sub-memories, one for the expanding direction and another for the concentrating direction. FIG. 11 shows the terminal units 61 and 65 in an unfolded form and the link 129 between these units is shown divided into two logic links, one for transporting a control packet in the concentrating direction and the other for transporting a control packet in the expanding direction. In the concentrating direction, an allocation memory 133K is provided on the transmitter side of the terminal unit 61 and an allocation memory 136K is provided on the receiving side of the terminal unit 85. In the expanding direction, an allocation memory 136E is provided on the transmitter side of the link 129 and an allocation memory 133E is provided on the receiver side of the terminal unit. Correspondingly, the same applies to each of the allocation memories 131, 134 on both sides of the link 63 and the allocation memories 135, 138 on both sides of the link 67.

Figure 12:
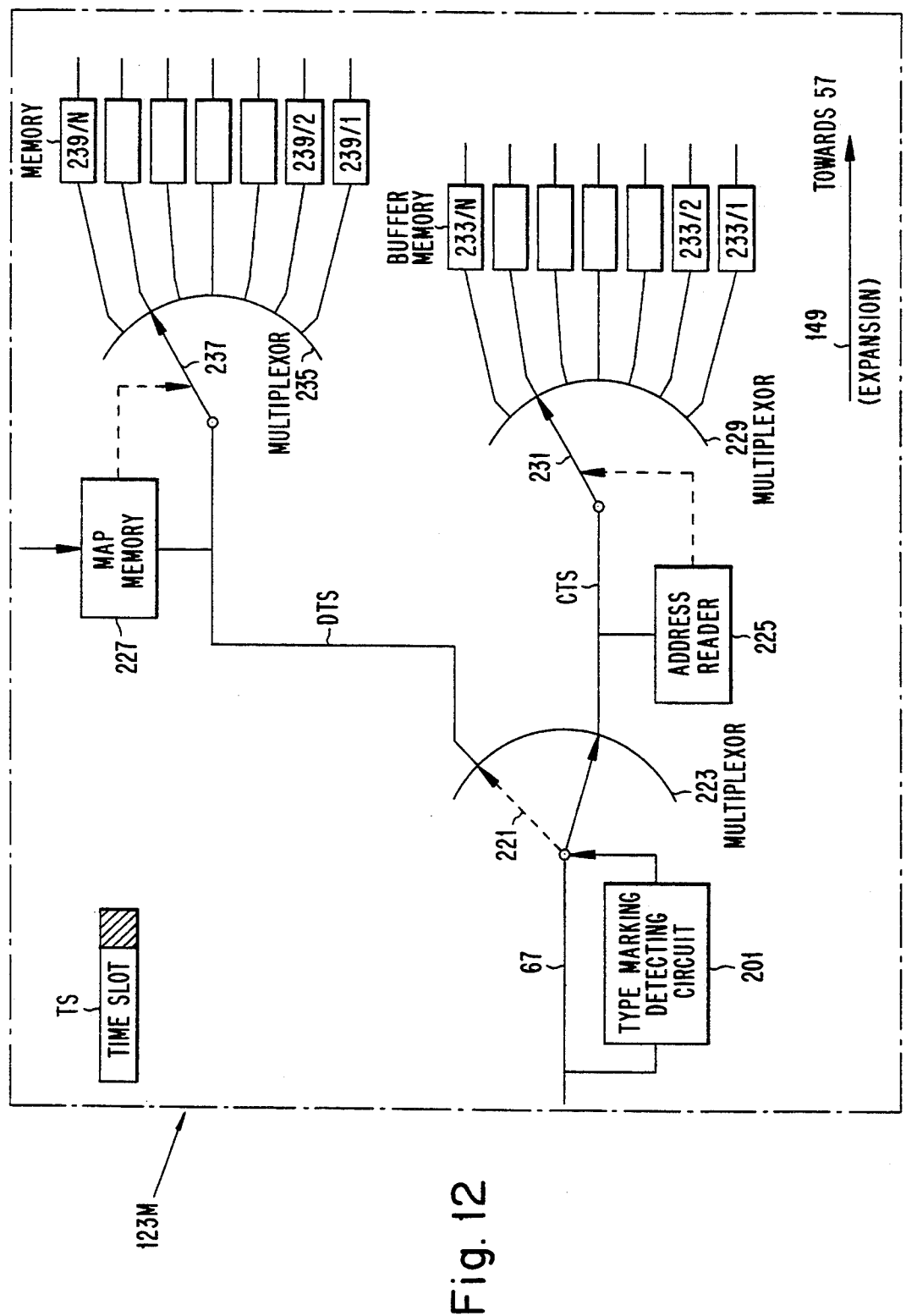
FIG. 12 is a block schematic of a second embodiment of a multiplexing device for multiplexing time slots in an inward direction towards the switch core, wherein the time slots themselves carry their own type-marking.

FIG. 12 illustrates the multiplexing stage 105M in a terminal connection unit 85 in the case when the time slots are type-marked, i.e. when the time slots themselves carry information which discloses whether they are control-time-slots or data-time-slots. The transmission direction is the same as that illustrated in FIG. 10, meaning that the time slots are expanded. A stream of type-marked time slots enters on the link 67. A type-marking detecting circuit 201 detects the type-marking of each slot and sets a switch arm 221 of a first multiplexor 223 to an upper position when the time slot concerned is a data-type, and to a lower position when the time slot is control-time-slot. The address on the control packet is now read with the aid of an address reader 225. A second multiplexor 229 has a switch arm 231 which is controlled by the address reader 225 for the control-time-slots and is set to a position which corresponds to the link that leads to the next-following terminal connecting unit. The control packet is stored in a buffer memory 233 prior to continuing on the link which leads to the destination address. The reference numeral 227 identifies a map memory which controls a time slot counter, symbolically indicated by the vertical arrow. A third multiplexor 235 has a switch arm 237 which is controlled by the map memory 227 and set thereby to a position which corresponds to the established circuit-switch connection with the unit to which the data-time-slot shall pass. Data and control-time-slots are multiplexed together in the same way as that described with reference to the multiplexor 199 in FIG. 10.

When comparing FIG. 10 with FIG. 12, it will be seen that the allocation memory 133E is not included when the time slots are marked, and is replaced by a type-marking identifying circuit. The allocation memory 134E is included irrespective of whether the time slots are marked or not.

If the time slots of the FIG. 9 embodiment are marked, the allocation memory 134K is replaced with a type-marking identification circuit similar to the circuit 201. The allocation memory 133K, however, must always be included.

If the time slots do not themselves carry a type-marking, a terminal unit will thus contain four allocation memories, e.g. 133E, 133K, 134E and 134K. When the time slots carry a type-marking, a terminal unit will only include two allocation memories, such as memories 133K and 134E, and two type-marking identification circuits 201.

Figure 13:
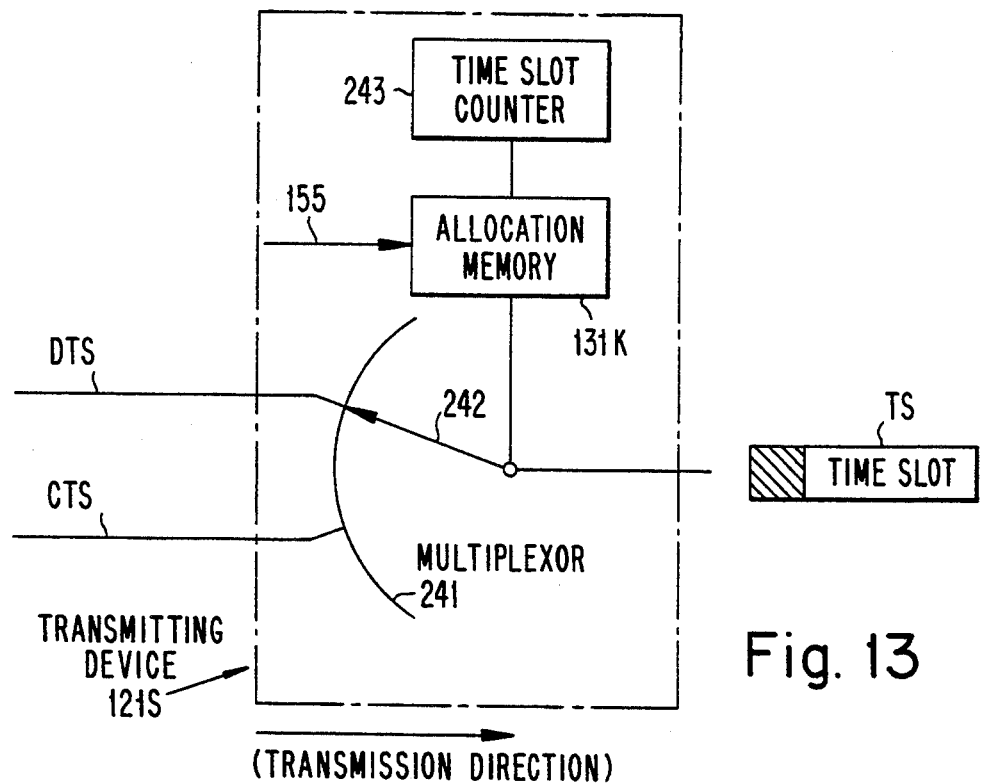
FIG. 13 is a block schematic of a device for changing the type-marking of time slots which themselves carry their own type-marking.

FIG. 13 illustrates a device which enables the switch to change the type-marking of a time slot which carries with it information concerning its identity. This type change can be made while the switch is in operation and takes place at the request of a connected unit. The device is located at the transmitting end of a link, for instance at the transmitting device 121S on the switch terminal unit 57. This unit includes a multiplexor 241 having a data-time-slot input DTS and another input CTS for control-time-slots. The multiplexor 241 has a switch arm 242 which is controlled by the content of the allocation memory 131K when the device is seated in the switch terminal unit 57, by the content of the allocation memory 133K when the device is seated in the terminal connection unit 61, by the content of the allocation memory 135K when the device is seated in the terminal connection unit 85, and by the content of the allocation memory 137K when the device is seated in the switch core 45. The system also includes a time slot counter 243 which is synchronous with each outgoing time slot. The allocation memory 131K controls the marking of the time slots and receives information concerning the types of all of the time slots sent on the link. The allocation memory 131K also knows whether a time slot shall be a DTS-type or a CTS-type of slot. When the marking of a time slot is to be changed, the content of the allocation memory 131K is also changed. The allocation memory 131K receives information concerning the type of time slots via, for instance, the packet channel.

Corresponding devices for changing the type-marking of the time slots are also provided in the expansion direction of the switch.

It is thus evident that those devices used in identifying the time slots are comprised of a type-marking detecting circuit, which is realized by the position of the switch arm 242 in combination with an allocation memory.

Multiplexing of the data-time-slots is controlled by the content of the map memories 139 and 141. The number of memory positions in a map memory equals the number of time slots in the frame sent on the link. Each memory position gives the terminal unit from which a time slot shall be read. Each of memory positions are read one by one in sequence and in synchronism with a time slot counter, not shown. The map memories are loaded by the map memory terminal 81 and 89 respectively, in conjunction with the configuring process. A map memory terminal can be accessed by a control packet, via the packet-switched network. The map memory 139 controls the multiplexing of the data-time-slots from all of those terminal units 57 that are connected to the terminal unit 61 in FIG. 8. The map memory 141 controls the multiplexing of data-time-slots from all of those terminal units 61 that are connected to the terminal unit 85 in FIG. 8. In the central circuit switch 47, all incoming time slots are written into the switch memories 49. Each time slot of a frame arriving at the switch core has a corresponding specific position in the switch memories. Data-time-slots are switched through the circuit switch in a conventional manner. This is effected as a result of the control memories 95, on corresponding memory positions in the switch memories, reading the sample in the time slot to be through-connected. The writing of data into the switch memories 49 takes place cyclically, once with each frame, wherein those samples which were written into the memories during a preceding frame are overwritten. Demultiplexing of the data-time-slots on the expanding side of the switch core 45 takes place in a similar manner.

Allocation of Control-time-slots to Units

Figure 14:
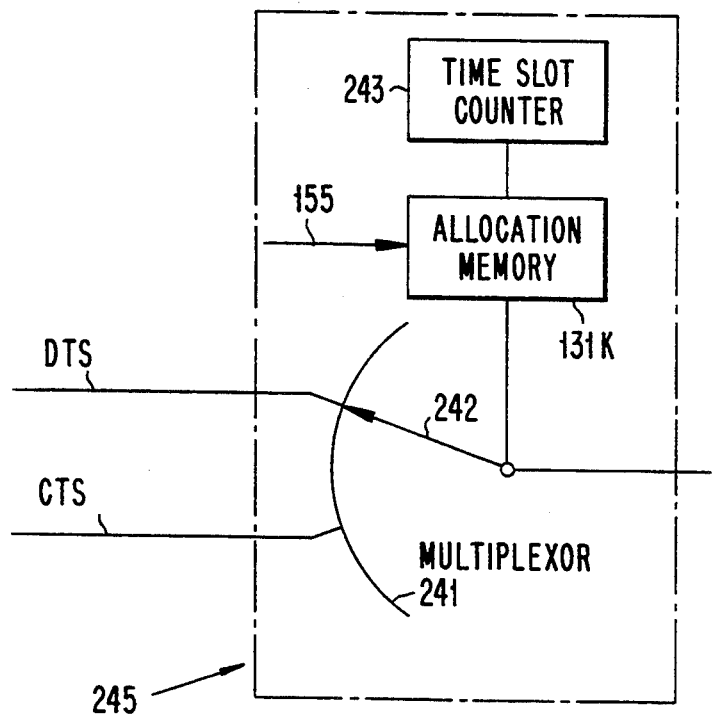
FIG. 14 is a block schematic of a device for assigning at least one control-time-slot to a unit.

FIG. 14 illustrates a system by means of which at least one control-time-slot is allocated to each connected unit. The system is similar to that illustrated in FIG. 13 and includes on the transmitting side of a link a unit 245 which is similar to the unit 121S in FIG. 13. The unit 245 includes the multiplexor 241 and, also in this case, the switch arm 242 of said multiplexor is controlled by an allocation memory 131K, 133K, 135K or 137K, depending upon the terminal unit the unit 245 is seated. It is assumed in the following that the unit 245 is seated in the switch terminal unit 57. The allocation memory 131K has an address pointer 155 which is stepped forwards by a time slot counter 243, in the same manner as that described with reference to FIG. 9. The time slot counter 243 is adapted to forcibly control the allocation memory 131K so that data which identifies the time slot as a control-time-slot is always written into a predetermined memory position, this position being determined by the unit itself. This is organized in a manner such that the count of the time slot counter 243 is continuously decoded. At a predetermined count, which is determined by the unit itself and which thus determines the position of the time slot in the frame, the time slot counter forcibly sets the multiplexor 241 so that its arm 242 is switched to the CTS position. By decoding the count of the time slot counter continuously, as the counter counts the time slots, and positively switch the switch arm 242 to the CTS position when the predetermined counter-setting is reached, the unit is always guaranteed at least one time slot. It will be realized that a unit can be guaranteed two time slots, by triggering the aforesaid writing and resetting process at two predetermined counts of the time slot counter.

A similar unit 245 is also provided in the expanding direction and at each terminal unit.

In the preferred embodiment of the inventive switch, the switch is triplicated and works in parallel synchronism. This is done for redundancy purposes and is a conventional technique and will therefore not be described in detail here. However, it is of interest in this context that the triplicated switch terminates in the switch terminal units 57.

By way of an example of devices which may wish to manoeuvre or control other devices directly, it can be mentioned that an outgoing exchange terminal (not shown) of the switch may discover losses in its synchronization. The exchange terminal wishes to report this to the system. This report is delivered by the exchange terminal through the processor seated on the exchange terminal card. This processor orders, via the packet channel, a processor in an operation monitoring system to establish a circuit-switched connection.

Figure 15:
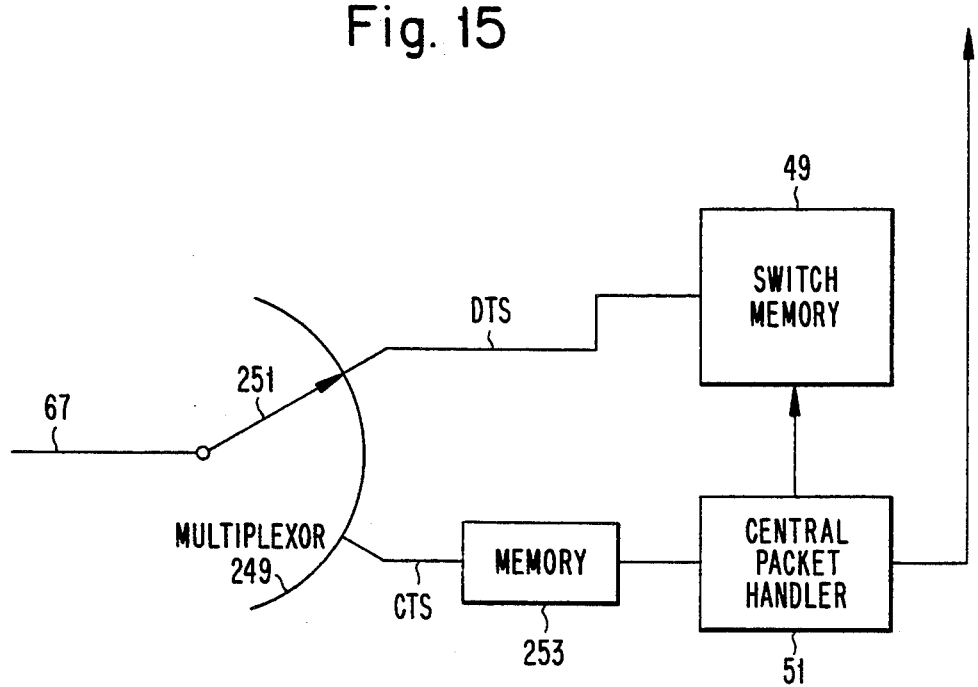
FIG. 15 is a block schematic of a device for handling time slots within the switch core.

Finally, FIGS. 7 and 15 illustrate handling of data-time-slots and control-time-slots within the switch core 45. Provided on the incoming link 67 of the switch core is a multiplexor 249 which has a switch arm 251 that can be switched between two positions. The switch arm 251 is either controlled by the marking carried by the time slots themselves or by an allocation memory whose content is updated from the allocation memory 135K in the transmitting part of the incoming link 67. The multiplexor 249 has two outputs, of which the upper output DTS leads to the switch memory 49 and the lower output CTS leads to a first-in-first-out memory 253. The central packet handler 51 scans the memory 253. If the control packet is addressed to the circuit setup terminal 93, the control packet is sent to the circuit setup terminal 93, which in turn delivers control information to the switch control memory 95.

The aforedescribed and illustrated embodiment of the invention can be varied and modified. For instance, the network structure shown in FIG. 8 may be different to the illustrated and described structure. Furthermore, the system may include more or fewer terminal connection units 61, 85. The system may also include flags other than those shown in FIGS. 4A–C and the bit patterns of the flags may also be different to those shown. The controllable multiplexors described with reference to FIGS. 9, 10 and 12 are described in more detail in our coterminous Swedish patent application 9103715-0. This patent specification describes a method of mapping buffer memories realized in the form of fifo-memories.

It should made clear that although the transmitting and receiving devices 121, 123, 125 and 129 by means of which a control packet is transmitted and received have been identified by different reference numerals in the various terminal units, said devices are in fact of identical construction.

We claim:

1. A uniswitch comprising a plurality of units which are distributed locally and which are mutually connected by means of physical links, wherein one of said units, called the switch core, includes a circuit switch for setting-up circuit-switched connections, said circuit switch including a central circuit switch having incoming and outgoing ports and also having control memories which define which incoming ports shall be connected with which outgoing ports for establishing the routes of the circuit-switched connections through the central circuit switch, wherein a distributed packet switch which includes a plurality of packet handlers is provided, said distributed packet switch includes a transmitting and receiving device for respectively transmitting and receiving control packets which are comprised of time slots wherein one packet handler is provided in each of said units, wherein the packet handlers and the physical links form a packet-switched network through which the control packets are switched by the packet switch, and a central packet handler provided at the switch core which includes circuit setup devices for interaction with control memories; and said control packets that are addressed to the central packet handler and contain a command requesting handling of a connection operate the central circuit switch upon being received in the central packet handler.

2. A uniswitch according to claim 1, wherein the time slots are of at least two different types, data-time-slots and control-time-slots wherein the control-time-slots constitute channels for control packet transmission and the data-time-slots constitute channels for data information transmission.

3. A uniswitch according to claim 2, wherein the packet handlers include multiplexing devices for multiplexing streams of time slots on respective links in different ways, depending on the type of time slot.

4. A uniswitch according to claim 3, wherein the switch core includes multiplexing devices for multiplexing incoming data-time-slots to the switch memory of the circuit switch while incoming control packets are multiplexed to a second memory of the first-in-first-out type, wherein the control-time-slots of the control packet are read from the second memory by the central packet handler for producing control information which is sent to the switch control memory and which is used to establish the circuit-switched connections through the switch.

5. A uniswitch according to claim 4, wherein the packet-switched network affects at least one control-time-slot, whereby each unit is able to communicate with any one of the remaining units, including the switch core, via the packet-switched network.

6. A uniswitch according to claim 5, wherein each unit is provided with an identification device which discloses at least one bandwidth which the unit wishes to have at its disposal during its communication with other units, said bandwidth being related to the number of control-time-slots and the number of data-time-slots over which the unit wishes to have at its disposal.

7. A uniswitch according to claim 6, wherein after receiving devices in the switch core receive a command requesting a desired activity over the packet channel, transmitting devices in the switch core send to that unit transmitting the command an acknowledgement that the command has been received.

8. A uniswitch according to claim 7, wherein the command is from among a group of commands consisting of establishing a connection, releasing a connection, configuring the links, a request for identification of connected units, and conventional flow commands used internally with each link.

9. A uniswitch according to claim 8, wherein in addition to the switch core, said switch units also includes:
  (i) switch terminal units at which the packet-switched switch terminates and to which switch external devices are connected by interface means;

(ii) a number of first terminal connection units which are connected in cascade between the switch terminal units and the switch core; and (iii) second terminal connection units and switch terminal units connected to said first terminal connection units.

10. A uniswitch according to claim 9, wherein the switch core and each terminal connection unit includes a respective allocation memory having memory positions which contain information concerning the order in which multiplexing of control-time-slots and data-time-slots takes place.

11. A uniswitch according to claim 10, wherein each terminal connection unit includes a respective map memory which contains information relating to the order in which multiplexing of data-time-slots takes place.

12. A uniswitch according to claim 11, wherein a processor polls each unit and requests information concerning the identification of said unit and, on the basis of said identification, determines the bandwidth that shall be allocated to the unit and the distribution of the number of control-time-slots and the number of data-time-slots within the allocated bandwidth.

13. A uniswitch according to claim 12, wherein marking devices are used for marking or labelling the time slots with an identity which denotes whether the time slot is a control-time-slot or a data-time-slot.

14. A uniswitch according to claim 13, wherein the processor coacts with the marking devices of all units for transferring said bandwidth and distribution information to the respective allocation memories of each unit.

15. A uniswitch according to claim 14, wherein each unit has defining devices which function to define at least one time slot as being of the control-time-slot type, said control-time-slot having one and the same position in those frames that are transmitted cyclically by the transmitting devices of the unit.

16. A uniswitch according to claim 15, wherein the defining devices include a time slot counter which functions to count the number of time slots in a frame, the allocation memory of the units, and an address pointer said address pointer being stepped forward by the time slot counter and points to a memory position in the allocation memory, said memory position corresponding to the position of the counted time slot within a frame; and in that when the counter reaches a predetermined count a marker bit is written into the allocation memory in a memory position that corresponds to the position of the time slot in said frame, said marker bit defining the time slot as being a control-time-slot.

17. A uniswitch according to claim 16, wherein said defining devices also function to mark the frame-contained time slots, wherein the type-marking of each time slot is written on a predetermined bit position in the counted time slot.

18. A uniswitch according to claim 17, wherein said defining devices also function as means for changing the bandwidth that has been self-allocated by a unit.

19. A uniswitch according to claim 18, wherein said marking devices include on the transmitting side of a link a time slot counter which counts the number of time slots in a frame, the allocation memory of the unit, and an address pointer which is stepped forward by the time slot counter and which point to a memory position in the allocation memory, this memory position corresponding to the position of the counted time slot within a frame and containing information concerning the type of time slot counted, and the marking devices include on the receiving side of the link a time slot counter which counts the number of time slots contained in a frame, the allocation memory of the unit, and an address pointer which is stepped forward by the time slot counter and which points to a memory position in the allocation memory, this memory position corresponding to the position of the counted time slot within a frame and containing information concerning the type of time slot counted, wherein the content of the allocation memory on the transmitting side is transferred to the allocation memory on the receiving side with the aid of time slots which are transmitting over the link between the transmitting and the receiving unit.

20. A uniswitch according to claim 3, wherein data-time-slots are multiplexed in a frame oriented manner and control-time-slots are multiplexed packet-wise in said multiplexing devices.

* * * * *